(12) United States Patent
Tanner

(10) Patent No.: US 6,825,412 B1
(45) Date of Patent: Nov. 30, 2004

(54) LOCATOR WIRE TERMINATOR

(75) Inventor: William A. Tanner, Metropolis, IL (US)

(73) Assignee: T-Squared, Inc., Metropolis, IL (US)

( * ) Notice: Subject to any disclaimer, the term of this patent is extended or adjusted under 35 U.S.C. 154(b) by 0 days.

(21) Appl. No.: 10/180,748

(22) Filed: Jun. 26, 2002

Related U.S. Application Data

(60) Provisional application No. 60/301,003, filed on Jun. 26, 2001.

(51) Int. Cl.[7] .................................................. H02G 9/00
(52) U.S. Cl. ....................... 174/37; 174/39; 174/65.1; 174/68.3; 174/25.1
(58) Field of Search ........................... 174/37, 39, 65.1, 174/68.3, 25.1

(56) References Cited

U.S. PATENT DOCUMENTS

| | | |
|---|---|---|
| 2,958,843 A | 11/1960 | Long |
| 3,055,970 A | 9/1962 | Handley |
| 3,676,567 A | 7/1972 | Zinn |
| 3,746,034 A | 7/1973 | Cosson |
| 4,151,458 A | 4/1979 | Seager |
| 4,346,254 A | 8/1982 | Borin et al. |
| 4,449,098 A | 5/1984 | Nakamura et al. |
| 4,621,476 A | 11/1986 | MacGregor |
| 4,767,237 A | 8/1988 | Cosman et al. |
| 4,885,428 A | 12/1989 | Roberts |
| 5,298,894 A | 3/1994 | Cerny et al. |
| 5,771,835 A | 6/1998 | Schneider |
| 6,084,393 A | 7/2000 | Yankielun |
| 6,286,542 B1 * | 9/2001 | Morain et al. .............. 137/317 |
| 6,351,126 B1 | 2/2002 | Belew et al. |

* cited by examiner

*Primary Examiner*—Dean A. Reichard
*Assistant Examiner*—Jinhee Lee
(74) *Attorney, Agent, or Firm*—King & Schickli, PLLC

(57) ABSTRACT

A novel device and method for electrical isolation of a locator wire for locating the position of a buried utility conveyance are disclosed. In one aspect, the device includes an electrically insulating sheath and an electrically conductive terminal in electrical communication with the locator wire. In another aspect, the present invention provides a method for electrically isolating a locator wire, including the steps of placing the locator wire in electrical communication with an electrically conductive terminal and surrounding the terminal with an electrically insulative sheath. In yet another aspect, the present invention provides a method for locating an underground utility conveyance, including the steps of positioning a locator wire in substantial alignment with the utility conveyance, placing the locator wire in electrical communication with an electrically conductive terminal surrounded by an electrically insulative sheath, applying a detectable signal to the locator wire, and detecting the signal.

12 Claims, 4 Drawing Sheets

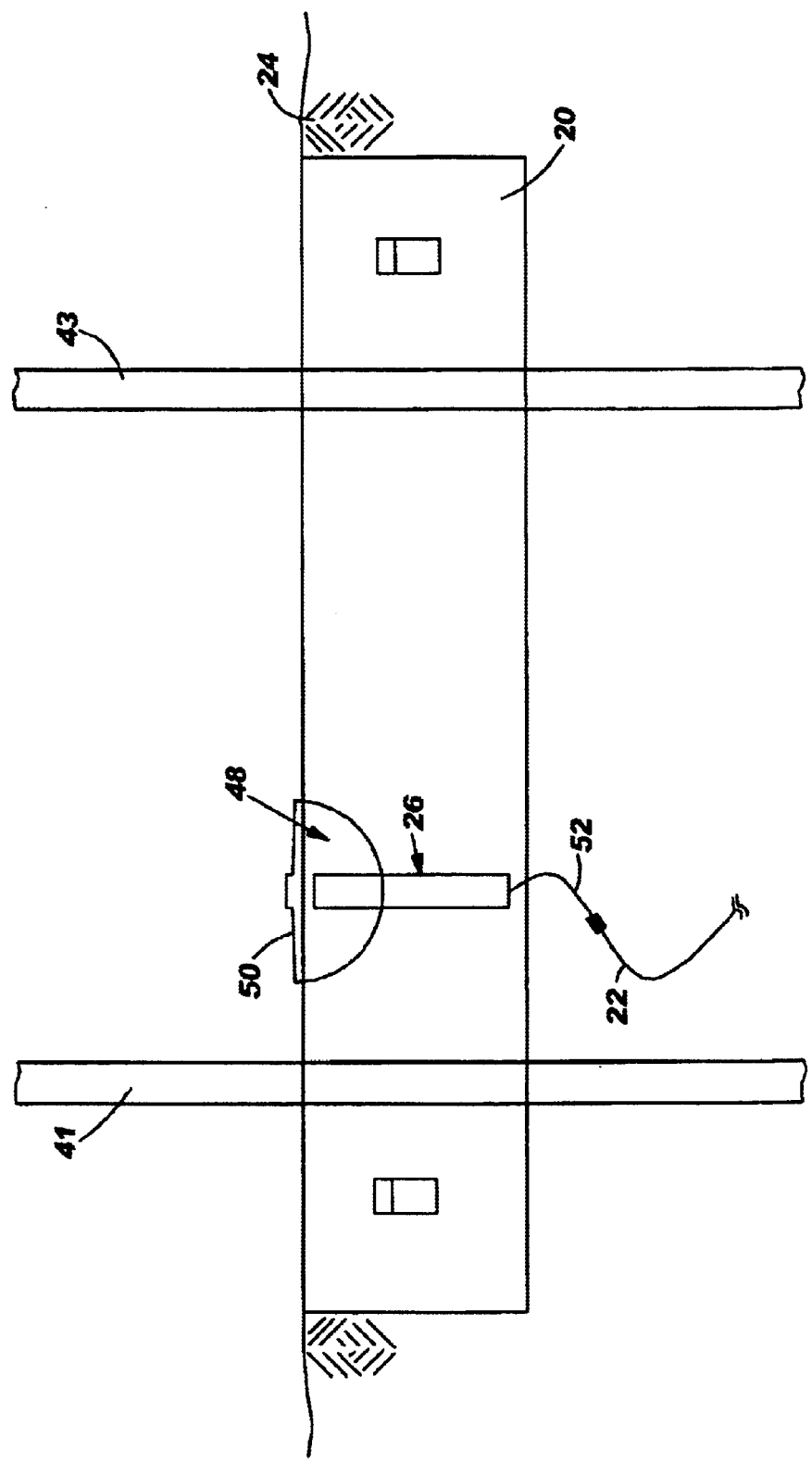

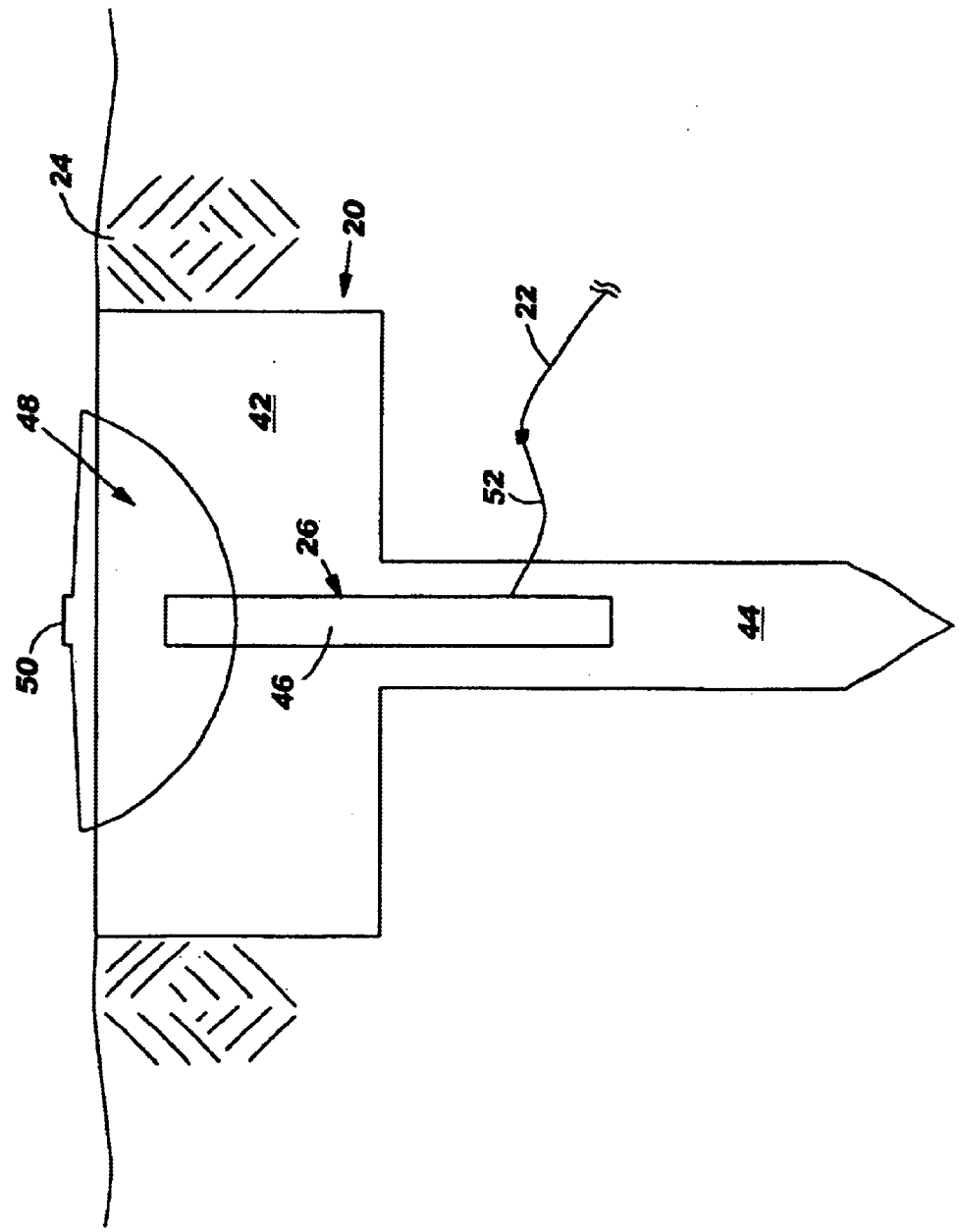

LOCATOR WIRE TERMINATOR

This application claims the benefit of U.S. Provisional Patent Application Ser. No. 60/301,003, filed Jun. 26, 2001.

TECHNICAL FIELD

The present invention relates to systems for terminating underground utility locator or trace wires. The invention relates more particularly to a method and device for terminating an underground utility locator wire that reduces the risk of signal bleed or transfer, protects the locator wire from damage, and reduces the amount of labor required for installation.

BACKGROUND OF THE INVENTION

It is known in the art to utilize trace or locator wires to mark the location of underground utility constructions such as water pipes, gas lines, and the like. The purpose of such locator wires is to provide a way to locate buried utility constructions, particularly in the case of non-electrically conductive utility constructions, by detecting a signal passed through the locator wire. Current utility construction practices include placement of an insulated locator wire in a trench containing, for example, a waterline or gas main. Commonly, non-electric grade insulated 12 gauge or 14 gauge wire is utilized. By connecting a line location transmitting device to the locator wire, a line location receiver may detect the signal induced, allowing easy location of an underground system such as a water line or gas main from the surface without need for random digging. This method is utilized by many utility companies to facilitate construction and/or excavation activities, i.e. to allow construction and/or repair work without fear of rupturing existing water lines or gas mains.

A locator wire must be terminated in some fashion. Current industry practices include connecting the locator wire to existing structures, such as, for example, fire hydrants or gate valves. Another common practice is to extend the locator wire above ground and directly attach it to a utility component. Yet another currently employed practice is to connect the locator wire to a short section of electrical ground rod and embed the rod in a concrete pad.

Disadvantageously, all of the above methods allow some level of signal bleed and/or signal transfer from the locator wire to adjacent utility constructions. Such signal bleed and/or transfer can result in difficulty in locating the buried utility construction. It is known that any signal bleed or transfer at or near the point at which a line location transmitter is connected to the locator wire will greatly reduce the distance at which the induced signal can be detected. In addition, the practice of extending the bare locator wire above ground exposes the wire to damage from, e.g., use of the utility component to which the wire is connected, mowing operations, or the like, and reduces the effective life of the locator wire. The practice of attaching the wire to a section of electrical ground rod and embedding the rod in concrete is labor intensive in the installation, and also allows signal bleed or transfer. Such signal bleed/transfer at or near the point where the line location transmitting device is connected to the trace wire greatly reduces the distance at which the induced signal may be detected.

Accordingly, there is need in the art for a method and apparatus for terminating locator wires to provide long-term usage with minimal loss of signal upon operation. There is further a need in the art for a method and apparatus for terminating locator or trace wires requiring less labor for installation than current systems.

SUMMARY OF THE INVENTION

In accordance with the purposes of the present invention as described herein, the present invention provides a device and method for terminating a locator wire, designed for use with any conventional locator wire. The present invention may be adapted for use near any known utility construction requiring locator wire, such as water lines, gas mains or lines, and the like. In one aspect, the present invention provides a device for terminating a locator wire for locating an underground utility conveyance, comprising a sheath for electrically isolating said locator wire from ground, and an electrically conductive terminal placed in electrical communication with the locator wire. Advantageously, the device of the present invention allows termination of a locator wire without need for attaching the wire to an existing utility, thereby minimizing signal bleed or transfer from the locator wire to the utility. Additionally, as will be described herein the device of the present invention eliminates the need to bring the locator wire aboveground for termination, thereby minimizing the risk of damage to the wire from incidental operations, such as mowing. Specifically, the present invention allows termination of a buried locator wire without need for bringing the wire aboveground.

In one embodiment, the sheath for electrically isolating the locator wire may be constructed as a unitary piece. In yet another embodiment, the sheath may comprise at least two interlocking members for capturing a portion of an existing structure, such as a utility construction, therebetween. Typically, the sheath will be fabricated from an electrically insulating material. Any suitable electrically insulating material may be selected, such as for example concrete, cement, plastic, polymers, rubber, or combinations thereof. The sheath may include a metallic outer rim, such as for example cast iron, to minimize risk of damage to the remaining components. However, it will be appreciated that in the case of a metallic component to the sheath, the electrically conductive terminal will be electrically isolated from any metallic component of the sheath to prevent signal bleed.

The sheath may include a recess for receiving the electrically conductive terminal, thereby maintaining the tip of the terminal below the top surface of the sheath and providing protection from incidental damage. Typically, the recess may include a cap or lid for covering the recess with the terminal received therein, thereby further protecting the terminal from incidental damage, inclement weather, and the like.

The electrically conductive terminal includes a body fabricated of an electrically conductive material, typically an electrically conductive metal such as copper, steel, galvanized steel, or aluminum. It will be appreciated that the body of the terminal may be of any desired shape, depending upon the specific installation requirements. The terminal may be placed in electrical communication with the locator wire by any conventional means, such as by use of a clamp, by wrapping the locator wire around the terminal, by soldering, or the like. The terminal may also include an integral wire tail for placing the terminal in electrical communication with the locator wire. The locator wire may be attached to the wire tail by any desired means, such as a conventional underground wire splice kit.

The terminal may be fabricated of a single metal, a combination of metals, or any suitable electrically conductive alloy. Any suitable metal possessing a high level of conductivity, but resistant to corrosion, may be used. In one embodiment of the present invention, the terminal may comprise an inner core and an outer coating wherein the inner core is fabricated from an easily detectable metal, and the outer coating is fabricated from a conductive metal. In a presently preferred embodiment, the inner core is fabricated of steel and the outer core is fabricated of copper. It will be appreciated that fabricating the terminal partially from an easily detectable metal such as steel facilitates location of the terminal in instances where the terminal is completely buried, for example using a conventional metal detector.

In another aspect of the present invention, a method for electrically isolating a locator wire for locating an underground utility conveyance is provided comprising the steps of positioning the locator wire in substantial alignment with a buried underground utility conveyance, placing an end of the locator wire in electrical communication with an electrically conductive terminal as described above, and electrically isolating the terminal, and thereby the attached locator wire, with an electrically insulating sheath as described above. As noted above, the locator wire may be directly attached to the terminal, or may be attached by means of an integral wire tail extending from the body of the terminal.

In still yet another aspect of the present invention, a method for locating an underground utility conveyance such as a water main or gas main is provided, comprising the steps of positioning an electrically conductive locator wire in substantial alignment with the underground utility conveyance, placing an end of the locator wire in electrical communication with an electrically conductive terminal, surrounding the electrically conductive terminal with an electrically insulating sheath, applying a suitable signal to the electrically conductive terminal, and therethrough to the electrically conductive locator wire using a suitable signal transmitter, and detecting the signal, and thereby the location of the locator wire and utility conveyance, with a detector. Numerous suitable signal transmitter and detector systems are known in the art for conductive tracing of a buried utility conveyance, such as generators for generating an electromagnetic signal, for generating a signal of a particular radio-frequency, and the like. In the case of a signal of a particular radio-frequency, a suitable signal is one applied at a frequency of from about 60 Hz to about 85 KHz.

In contrast to conventional methods of terminating a locator wire, such as directly attaching the wire to a utility construction or to a grounding rod (both of which allow signal bleed and expose the locator wire, risking damage thereto), the present invention allows a completely insulated, electrically isolated connection which is physically protected from damage and minimizes the risk of signal bleed or transfer to adjacent utilities. Other objects and applications of the present invention will become apparent to those skilled in this art from the, following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing:

FIG. 3 is a side elevational representation showing a cross-sectional view of the locator wire terminator of the present invention, showing a sheath comprising two interlocking plastic members configured to engage a utility construction comprising dual riser pipes.

FIG. 4 is a side elevational representation showing a cross-sectional view of the locator wire terminator of the present invention comprising a stand-alone, unitary sheath which may be driven into the ground at a desired location.

Reference will now be made in detail to the presently preferred embodiments of the invention, examples of which are illustrated in the accompanying drawing.

DETAILED DESCRIPTION OF THE INVENTION

Figure 1:
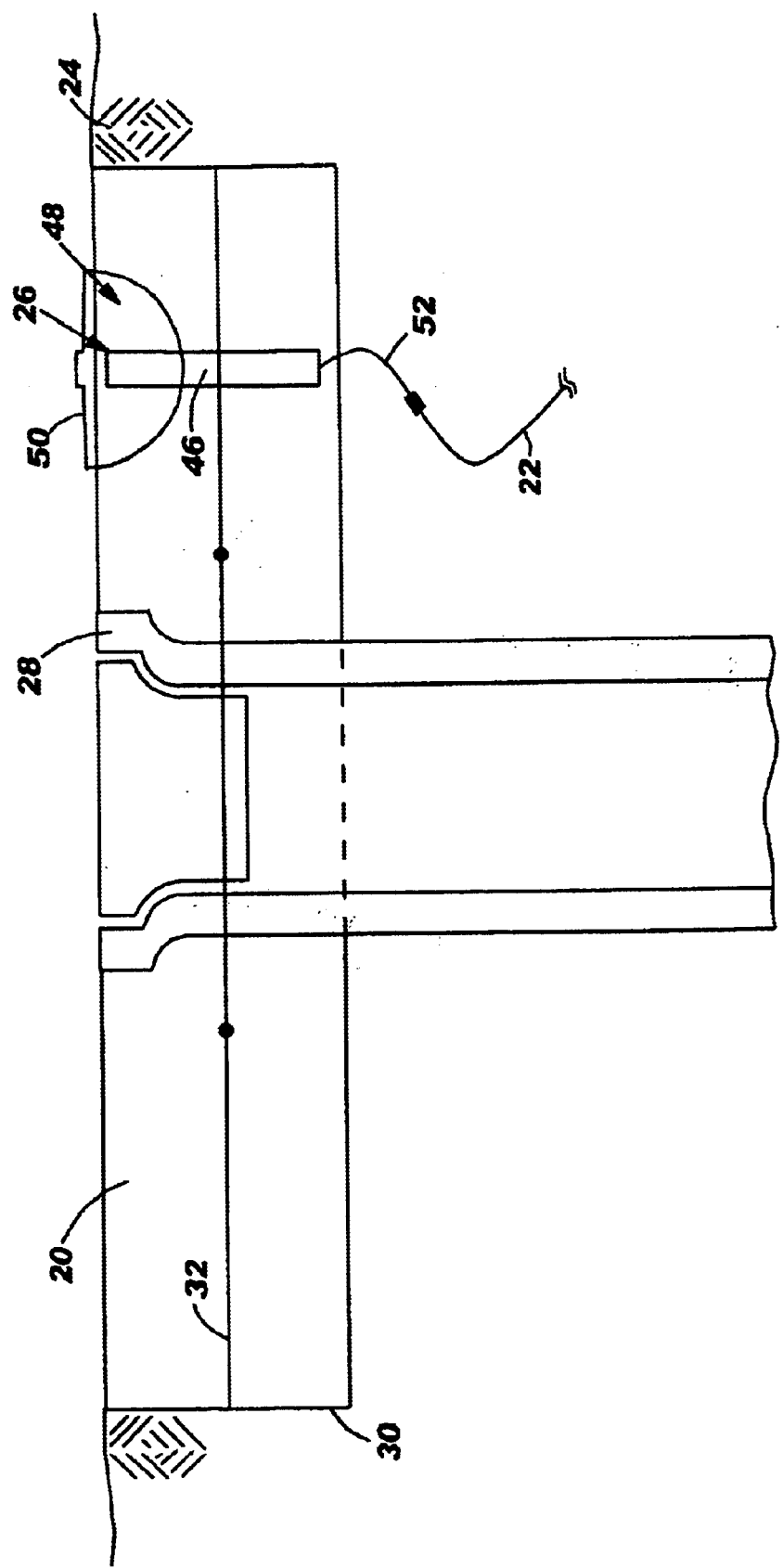
FIG. 1 is a side elevational representation showing a cross-sectional view of the locator wire terminator of the present invention showing a unitary sheath comprising poured concrete.

As summarized above, in one aspect the present invention provides a device and method for terminating a locator wire which is adaptable for any known utility construction to be traced using a locator wire, such as a gas or water main. Referring to FIG. 1, the present invention, as shown in the accompanying drawings, provides a locator wire terminator 10 comprising a sheath 20 for electrically isolating a locator wire 22 from the ground 24, and an electrically conductive terminal 26 which may be placed in electrical communication with locator wire 22. In a presently preferred embodiment, sheath 20 may be configured to surround a utility construction 28, which for purposes of illustration only is depicted in FIG. 1 as a gate valve box of conventional construction. It will be appreciated that sheath 20 may be constructed in any of a number of ways from an number of suitable electrically insulating materials. For example, FIG. 1 depicts a concrete sheath 20, formed by placing a form 30 around utility construction 28 and pouring concrete therein. In this embodiment, reinforcing rods 32 may be added to add strength to the concrete. It will be appreciated that form 30 may be any suitable substance in accordance with the desired shape, such as a plastic or cast iron ring. The sheath 20 may be placed so as to be flush with the surface of the ground or raised above grade, as needed. It will also be appreciated that sheath 20 may be fabricated from any suitably insulating material, such as plastic, any of a variety of polymers, rubber, or the like.

Figure 2:
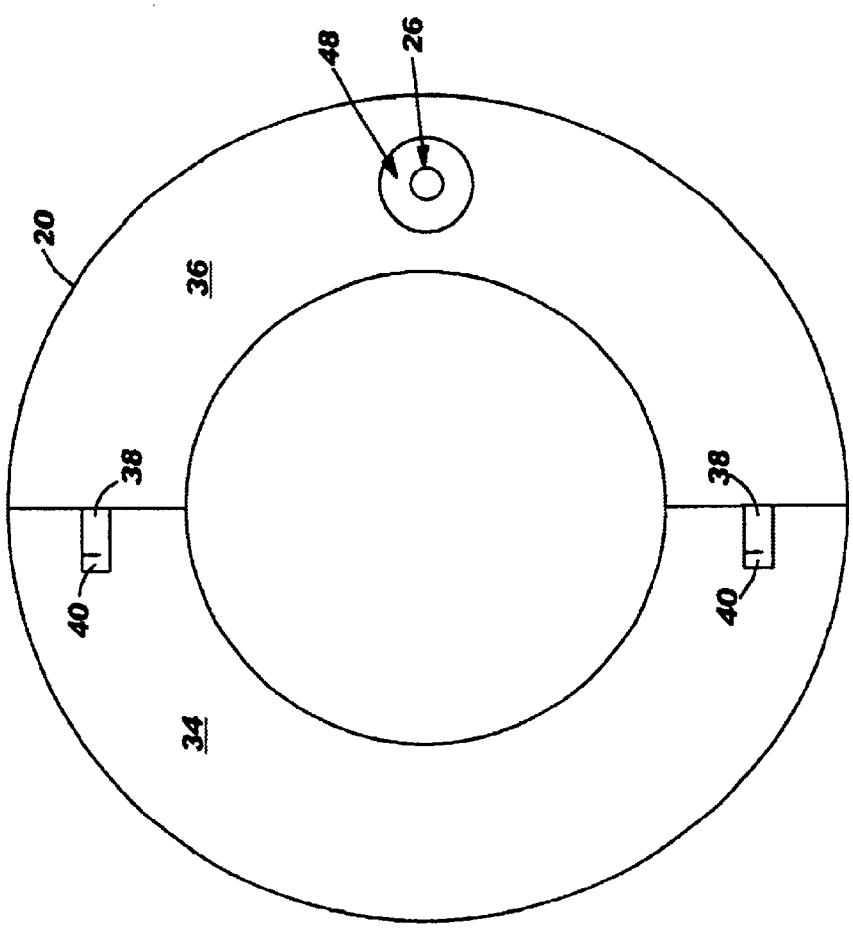
FIG. 2 is a top plan view of the locator wire terminator of the present invention, showing a sheath comprising two interlocking plastic members.

In another aspect, the sheath 20 may comprise a multi-piece unit of pre-formed members. In one embodiment, as best seen in FIG. 2, sheath 20 may comprise at least two interlocking members 34, 36 having cooperating tabs 38 for engaging slots 40, thereby causing sheath 20 to capture a utility construction 28 therebetween. It will, however, be appreciated that any suitable method of affixing interlocking members 34, 36 to one another to capture a utility construction 28 between may be utilized, such as for example cooperating tabs 38 and slots 40 defining snap locks, or an epoxy glue. In situations where the utility construction 28 and corresponding sheath 20 are entirely buried, fastening the pieces of the pad together may be unnecessary.

The desired shape of the interlocking members will, of course, be determined by the configuration of the utility construction which is to be captured therebetween. For example, as shown in FIG. 3, the multi-piece sheath 20 may be used in conjunction with a different type of utility structure such as paired ground protruding pipes 41, 43 (for example, a gas riser). In this embodiment, the multi-piece sheath 20 maybe constructed of any suitable material, typically a lighter material of suitable strength and durability, such as plastics or polymers, for ease of handling and installation.

In still yet another embodiment of the invention, sheath 20 may comprise a unitary, stand-alone unit of any desired shape. In a presently preferred embodiment as shown in FIG. 4, sheath 20 may include a head 42 and a shaft 44, configured to allow sheath 20 to be driven into the ground at any desired location independent of the placement of a utility construction. It will be appreciated that this embodiment allows tracing and location of a buried utility conveyance such as a gas main or water main which is capped below the surface of the ground, rather than ending at an above-ground or ground surface utility construction. Accordingly, a locator wire may be terminated using the device of this invention in the absence of an aboveground or ground level free-standing utility structure.

The locator wire terminator further includes at least one electrically conductive terminal 46 which is separate from but which may be placed in electrical communication with a conventional locator wire 22. The terminal 46 may be fabricated from an electrically conductive material, typically any suitable electrically conductive, corrosion-resistant metal. The terminal 46 may be fabricated from a single metal, a combination of metals, or any suitable alloy. In a preferred embodiment, terminal 46 includes an inner core and an outer coating. Typically, the inner core may be fabricated from steel, and the outercoating may be fabricated from copper. It will be appreciated that this feature allows detection (via the inner steel core) of a buried terminal 46 by any conventional means, such as a metal detector, while retaining electrical conductivity. Sheath 20 may include a plurality of terminals 46 for terminating a plurality of locator wires 22, in situations where several different types of utility are located near one another. In use, terminal 46 will be at least partially enclosed within the sheath 20.

Terminal 46 may be embedded in the sheath 20 such that terminal 46 is at least partially enclosed in sheath 20 to protect it from damage. Preferably, the terminal 46 may be embedded in a recess 48 in the sheath 20, thereby protecting the terminal 46 from damage by placing it below the upper surface of the sheath 20, but maintaining accessibility. A cap or lid 50 may be provided for sealing the recess 48, thereby protecting the terminal 46 from inclement weather and incidental damage. Terminal 46 may be removably inserted in recess 48 in sheath 20, or may be permanently embedded therein by any suitable means, such as an epoxy glue or any suitable adhesive.

The locator wire 22 may be attached to the terminal 46 by any conventional means, such as by a clamp, by soldering, or by simply wrapping the locator wire around terminal 46. Preferably, locator wire 22 is placed in electrical communication with terminal 46 below or near the bottom surface of sheath 20. In a preferred embodiment, terminal 46 may include an integral wire tail 52 for placing terminal 46 in electrical communication with a locator wire 22 by any suitable means, such as a conventional underground wire splice kit. Typically, wire tail 52 may extend beyond a bottom surface of sheath 20. It will be appreciated that this feature allows terminal 46 to be placed in electrical communication with a locator wire 22 without need for extending the locator wire above the surface of the ground. In this fashion, the risk of incidental damage to locator wire 22 by, for example, mowing or string trimmers, is reduced or eliminated.

In accordance with standard practice in the industry, the entirety or a portion of the sheath 20 of this invention may be differently colored in accordance with the type of utility with which it is paired. It is standard practice in this art to utilize different colors to identify different types of utility constructions. For example, it is known in the art to use the color red to identify electrical utilities, blue to identify water lines, yellow to identify gas mains, and so on. Advantageously, this allows personnel undertaking repair work or other construction to identify the type of utility construction(s) buried nearby, and take appropriate precautionary measures.

In another aspect of the present invention, a method for electrically isolating a locator wire 22 for locating an underground utility conveyance (not shown) such as a buried water main or gas line is provided, comprising the steps of positioning the locator wire 22 in substantial alignment with a buried underground utility conveyance, placing the locator wire 22 in electrical communication with an electrically conductive terminal 46 as described above, and electrically isolating the terminal 46, and thereby the attached locator wire 22, with an electrically insulating sheath 20 as described above. The locator wire 22 may be in proximity with the utility conveyance, or may be in substantial contact with the conveyance. As noted above, the locator wire 22 may be directly attached to the terminal 46, or may be attached by means of an integral wire tail 52 extending from the body of the terminal 46.

In still yet another aspect of the present invention, a method for locating an underground utility conveyance such as a water main or gas main is provided, comprising the steps of positioning an electrically conductive locator wire 22 in substantial alignment with the underground utility conveyance, placing one end of the locator wire 22 in electrical communication with an electrically conductive terminal 46, surrounding the electrically conductive terminal 46 with an electrically insulating sheath 20, applying a suitable signal to the terminal 46 and therethrough to the electrically conductive locator wire 22 using a suitable signal transmitter, and detecting the signal, and thereby the location of the locator wire 22 and utility conveyance, with a detector at any desired position along the utility conveyance. Numerous suitable signal transmitter and detector systems are known in the art for conductive tracing of a buried utility conveyance, such as transmitters for generating an electromagnetic signal, for generating a signal of a particular frequency, and the like. In the case of a signal of a particular frequency, a suitable signal may be applied at a frequency of from about 60 Hz to about 85 KHz.

Thus, in contrast to conventional methods of terminating a locator wire, such as directly attaching the wire to a utility construction or to a grounding rod (both of which allow signal bleed and expose the locator wire, risking damage thereto), the present invention allows a completely insulated, electrically isolated connection which is physically protected from damage and minimizes the risk of signal bleed or transfer to adjacent utilities. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

What is claimed is:

1. A device for terminating a locator wire for locating an underground utility conveyance, comprising:
   a sheath for electrically isolating said locator wire from ground; and
   at least one electrically conductive terminal separate from and in electrical communication with said locator wire;
   wherein when said device is in use the at least one electrically conductive termninal is at least partially enclosed within the sheath.

2. The device of claim 1, wherein said sheath is unitary.

3. The device of claim 1, wherein said sheath comprises at least two interlocking members for capturing a structure therebetween.

4. The device of claim 3, wherein said structure is a utility construction.

5. The device of claim 1, wherein said sheath is fabricated from an electrically insulating material.

6. The device of claim 5, wherein said electrically insulating material is selected from the group consisting of concrete, plastic, polymers, rubber, and any mixture thereof.

7. The device of claim 1, wherein said sheath includes a recess for receiving said electrically conductive terminal below a top surface of said electrically insulating sheath.

8. The device of claim 1, wherein said electrically conductive terminal includes a body and an integral wire tail for placing said body in electrical communication with said locator wire.

9. The device of claim 1, wherein said electrically conductive terminal is fabricated from an electrically conductive metal.

10. The device of claim 1, wherein said electrically conductive terminal comprises an inter core and an outer coating.

11. The device of claim 10, wherein said inner core is steel.

12. The device of claim 10, wherein said outer coating is copper.

* * * * *